(12) United States Patent
Dresser, III (10) Patent No.: US 9,323,288 B2
(45) Date of Patent: Apr. 26, 2016

(54) TABLET COMPUTER STORAGE AND CHARGING APPARATUS

(75) Inventor: Walter James Dresser, III, Sycamore, IL (US)

(73) Assignee: New Concepts Development Corp., Woodstock, IL (US)

( * ) Notice: Subject to any disclaimer, the term of this patent is extended or adjusted under 35 U.S.C. 154(b) by 801 days.

(21) Appl. No.: 13/446,847

(22) Filed: Apr. 13, 2012

(65) Prior Publication Data
US 2012/0262120 A1    Oct. 18, 2012

Related U.S. Application Data

(60) Provisional application No. 61/475,271, filed on Apr. 14, 2011.

(51) Int. Cl.
| | |
|---|---|
| *H02J 7/00* | (2006.01) |
| *G06F 1/16* | (2006.01) |
| *G06F 1/26* | (2006.01) |
| *A45C 11/00* | (2006.01) |

(52) U.S. Cl.
CPC .............. *G06F 1/1632* (2013.01); *A45C 11/00* (2013.01); *G06F 1/26* (2013.01); *H02J 7/0044* (2013.01); *A45C 2011/003* (2013.01); *A45C 2200/15* (2013.01); *Y10T 29/49117* (2015.01)

(58) Field of Classification Search
USPC .......................................... 320/115
See application file for complete search history.

(56) References Cited

U.S. PATENT DOCUMENTS

| | | | | |
|---|---|---|---|---|
| 7,130,190 | B1 * | 10/2006 | Baker ........................... | 361/695 |
| 8,796,987 | B2 * | 8/2014 | Scheucher .................... | 320/104 |
| 2010/0176762 | A1 * | 7/2010 | Daymude et al. ............ | 320/115 |

* cited by examiner

*Primary Examiner* — Yalkew Fantu
(74) *Attorney, Agent, or Firm* — Scherrer Patent & Trademark Law, P.C.; Stephen T. Scherrer; Monique A. Morneault (57) ABSTRACT

An apparatus having a plurality of storage slots aids in storing tablet computers, specifically iPad, for charging and/or transmitting data to and/or from. Moreover, the apparatus allows for automatically plugging a tablet computer into either a charging cable and/or a data transmission cable when disposing in the apparatus. Methods of making and using the same are provided.

18 Claims, 7 Drawing Sheets

TABLET COMPUTER STORAGE AND CHARGING APPARATUS

The present invention claims priority to U.S. Provisional Patent Application No. 61/475,271, entitled "Computer Tablet Storage and Charging Apparatus," filed Apr. 14, 2011, which is incorporated herein by reference in its entirety.

TECHNICAL FIELD

The present invention relates to an apparatus having a plurality of storage slots or shelves for storing tablet computers, specifically iPad. Moreover, the present invention relates to an apparatus for automatically plugging a tablet computer into either a charging cable and/or a data transmission cable when disposing in the apparatus. Methods of making and using the same are provided.

BACKGROUND

It is generally known to utilize tablet computers, and other like computing devices, for day-to-day use. Specifically, tablet computers, namely computers consisting of a large touch screen, and other buttons and functionality, have recently become more popular, in light of their relatively large and usable screen, their features, computing power and speed, and their portability.

As with any portable electronic device, tablet computers, such as iPad and the like, typically have one or more internal batteries that must be charged periodically to maintain their usefulness. Specifically, to utilize tablet computers when traveling or otherwise away from a power source, the battery or batteries should be sufficiently charged to run the tablet computers for a sufficient period of time.

Moreover, it is generally known to connect data transmission cables to portable tablet computers so as to transmit data, such as through a USB cable to another computer, such as to a server for distribution of data to other computing devices. In many cases, the cable utilized for charging a tablet computer is the same cable that may be utilized for transmitting data. Indeed, connecting a tablet computer, such as an iPad, through a USB port to another computing device will serve the dual purpose of charging the battery or batteries in the tablet computer and allowing for the transmission of data to and/or from the tablet computer.

In addition, tablet computers, such as iPad, because of their ease of use and portability, generally are easily distributed to others, especially in a school or work setting. For example, a plurality of tablet computers may be utilized by a plurality of temporary users to accomplish specific tasks, such as school tasks or work tasks. Thus, it would be useful to utilize a central storage location for a plurality of tablet computers that may be utilized by one or more individuals.

Storage units for storing computing devices are generally known. These may consist of carts having a plurality of shelves that hold one or more computing devices. Typically, these storage units hold a plurality of laptop computers, one to a shelf. Generally, the storage units may provide for the charging of the computing devices and/or the transmission of data to and/or from the computing devices. But in many instances, if a connecting cable is provided, it is typically a free hanging data or power cable, or a power outlet is provided for connecting to the computing devices for charging and/or data transmission. Thus, an individual is typically tasked with physically manipulating the cables and connecting them to the computing devices.

Moreover, it may be difficult to keep the plurality of computing devices cool when disposed within a known storage cart, due to the relatively enclosed shelving provided within the known storage carts.

A need, therefore, exists for an apparatus for storing a plurality of computing devices, such as tablet computers. A need further exists for an apparatus allowing quick and easy distribution of computing devices to one or more individuals requiring use thereof.

In addition, a need exists for an apparatus for storing a plurality of computing devices providing security, such that the computing devices may be snugly held within the apparatus. Moreover, a need exists for an apparatus for storing a plurality of computing devices that may provide necessary airflow capabilities to keep the computing devices cool, especially when charging.

Further, a need exists for an apparatus for storing a plurality of computing devices allowing an individual to automatically connect the computing device to a charging cable for charging one or more batteries contained therein when disposed within the apparatus. Still further, a need exists for an apparatus for storing a plurality of computing devices allowing an individual to automatically connect the computing device to a data transmission cable for transmitting data between the computing device and one or more other computing devices.

SUMMARY OF THE INVENTION

The present invention relates to an apparatus having a plurality of storage slots or shelves for storing tablet computers, specifically iPad. Moreover, the present invention relates to an apparatus for automatically plugging a tablet computer into either a charging cable and/or a data transmission cable when disposing in the apparatus. Methods of making and using the same are provided.

To this end, in an embodiment of the present invention, an apparatus for storing one or more tablet computers is provided. The apparatus comprises a top plate, a bottom base, two oppositely disposed side walls and a back plate, configured in a rectangular box configuration and having a front opening, each of the two side walls having pairs of slots for holding a tablet computer, and a plurality of openings in the back plate, each of the openings rigidly holding a dock cable end for automatically connecting to the tablet computer when the tablet computer is disposed within the apparatus.

It is, therefore, an objective of the present invention to provide an apparatus for storing a plurality of computing devices, such as tablet computers.

It is a further objective of the present invention to provide an apparatus allowing quick and easy distribution of computing devices to one or more individuals requiring use thereof.

In addition, it is an objective of the present invention to provide an apparatus for storing a plurality of computing devices providing security, such that the computing devices may be snugly held within the apparatus.

Moreover, it is an objective of the present invention to provide an apparatus for storing a plurality of computing devices that may provide necessary airflow capabilities to keep the computing devices cool, especially when charging.

Further, it is an objective of the present invention to provide an apparatus for storing a plurality of computing devices allowing an individual to automatically connect the computing device to a charging cable for charging one or more batteries contained therein when disposed within the apparatus.

Still further, it is an objective of the present invention to provide an apparatus for storing a plurality of computing devices allowing an individual to automatically connect the computing device to a data transmission cable for transmitting data between the computing device and one or more other computing devices.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an apparatus for storing tablet computers, specifically iPad. Moreover, the present invention relates to an apparatus for automatically plugging a tablet computer into either a charging cable and/or a data transmission cable when disposing in the apparatus. Methods of making and using the same are provided.

Figure 1:
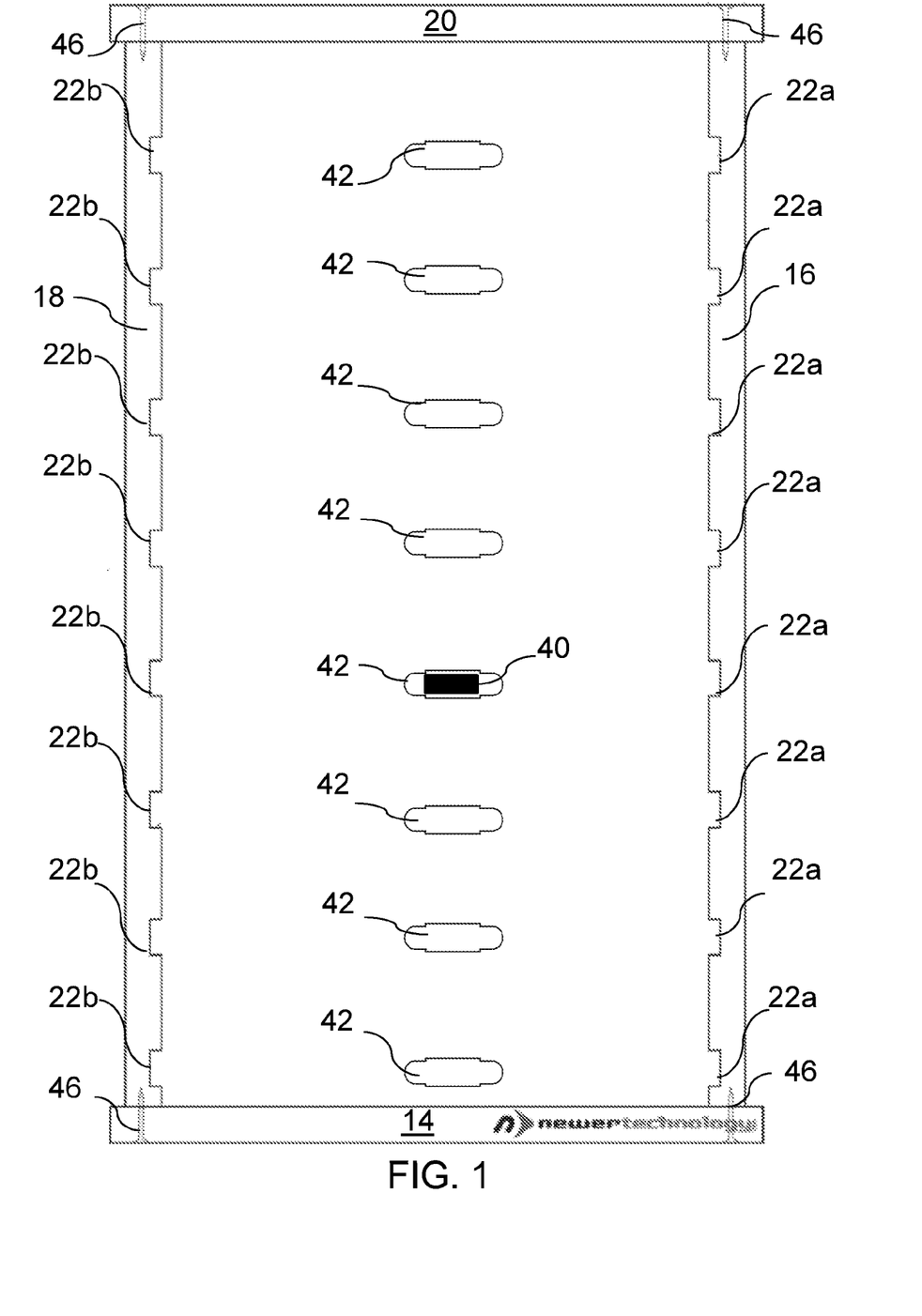
FIG. 1 illustrates a front end plan view of an apparatus for storing and automatically connecting one or more tablet computers to a charger and/or data transmission cable.

Now referring to the drawings, FIG. 1 illustrates a plan view of an apparatus 10 in an embodiment of the present invention. Specifically, the apparatus 10 comprises a top plate 12, a bottom base 14, two side walls 16, 18, and a back plate 20. Generally, the top plate 12, the bottom base 14, the two side walls 16, 18, and the back plate 20 are connected together, such as via screws, pins, nails, adhesive, or any other means known to those of ordinary skill in the art, to form a rectangular box-shaped configuration, with a front open space for placing tablet computers, as described below.

The apparatus 10 may be constructed from any material apparent to one or ordinary skill in the art, such as metal, wood, plastics and other like material. In a preferred embodiment, the apparatus 10 may be constructed by a material that does not hold a charge, thereby minimizing damage that may be caused by the tablet computers (as described in more detail below) that may be stored therein. An advantage of the present invention is to charge and/or transmit data to and from the tablet computers stored therein, and utilizing a material that does not hold a charge will help to minimize damage caused by charge build-up. Preferably, the apparatus 10 is made from recycled polymeric material.

Moreover, the bottom base 14 may have tabs (not shown) that may help stabilize the apparatus 10 when disposed on a flat surface. In addition, the top plate 12 may include apertures or indentations for receiving the tabs on the bottom base 14 for nesting when a plurality of apparatus 10 is stacked, such as for transport.

Generally, the two side walls 16, 18 each have a plurality of pairs of slots 22a, 22b for holding one or more tablet computers. Specifically, each of the plurality of slots 22a may have a corresponding slot of the plurality of slots 22b for holding one or more tablet computers. Generally, the slots operate as shelves and hold edges of the tablet computers, while retaining generally an open space in the middle of the apparatus for minimizing disruptions to airflow.

Figure 2:
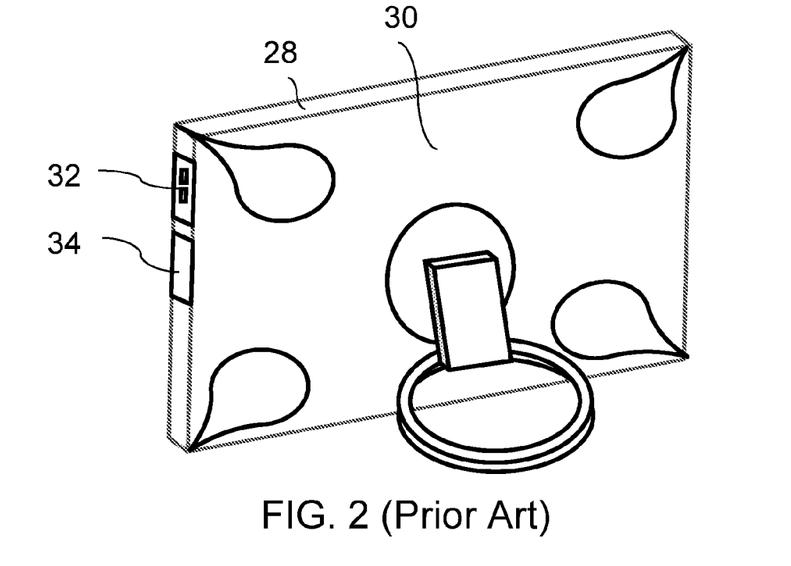
FIG. 2 illustrates a prior art view of a case for holding a tablet computer, such as an iPad.

In a preferred embodiment of the present invention, the apparatus 10 of the present invention may hold a plurality of tablet computers, each of which may be contained within a housing or a case. Specifically, FIG. 2 shows a tablet computer 28, such as, preferably, an iPad, within a case 30 that may be preferred for holding an iPad in an embodiment of the present invention. Generally, the case may be a so-called "snap case", in which the case snaps around the edges of the tablet computer, thereby protecting the same. The case 30 may have a plurality of openings disposed around the periphery of the case 30 (shown as openings 32, 34 in FIG. 2) for accessing buttons, and input ports on the tablet computer 28. The case 30, shown in FIG. 2, is an Aidata, Inc. iPadStand, Item No. ISP002, more information of which may be found at http://www.aidata.com.tw/new-products/1749?c=0&k=.

Figure 3:
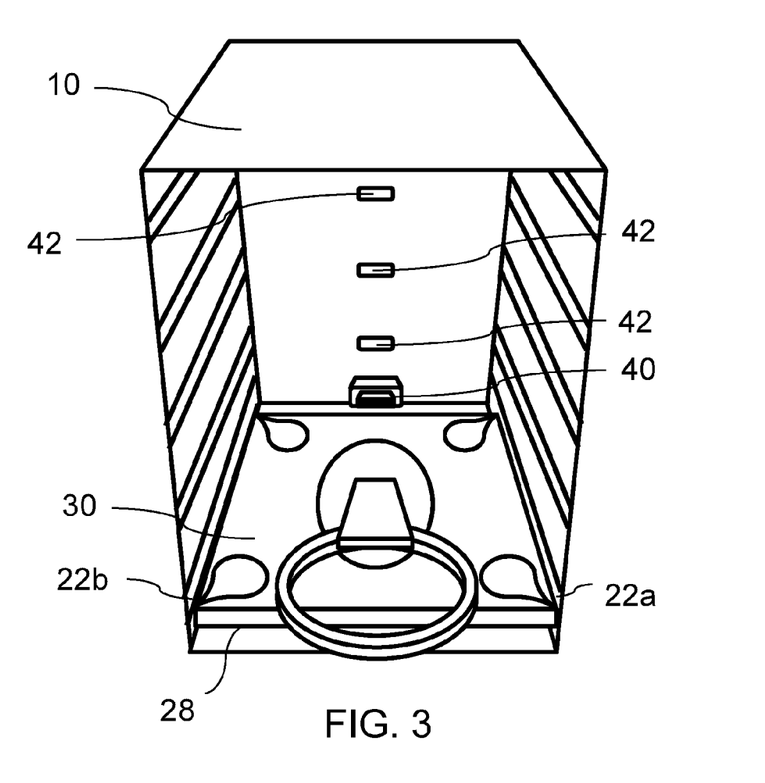
FIG. 3 illustrates a front end perspective view of an apparatus for storing and automatically connecting one or more tablet computers to a charger and/or data transmission cable, in an embodiment of the present invention.

FIG. 3 illustrates the apparatus 10 having a tablet computer 28 within case 30 disposed therein on one of the pair of slots 22a, 22b. The tablet computer 28 and case 30 may have just enough space to slide along the pair of slots 22a, 22b to fit snugly within the apparatus 10.

Also illustrated in FIGS. 1 and 3 is a dock cable end 40 that may be rigidly held in one of a plurality of dock cable openings 42 disposed in the back plate 20 of the apparatus 10. A plurality of dock cable ends 40 may be disposed in the plurality of dock cable openings 42, one dock cable end 40 to each dock cable opening 42.

Because the dock cable openings 42 may rigidly hold a plurality of dock cable ends 40, the dock cable ends 40 may be aligned with a dock port on the tablet computers 28, and thus the tablet computers 28 may automatically dock or connect with the dock cable ends 40 rigidly held in the dock cable openings 42.

Figure 4:
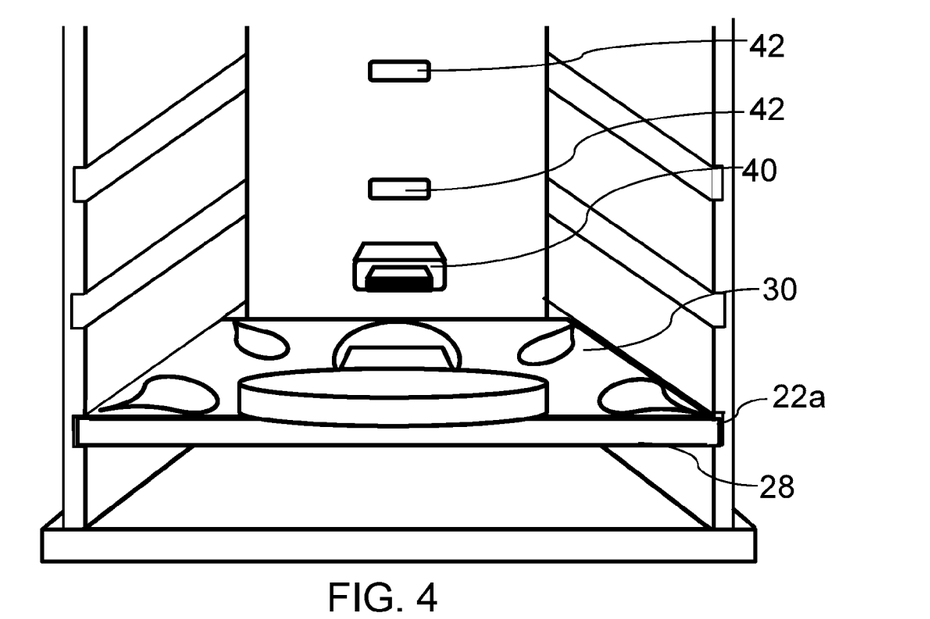
FIG. 4 illustrates a close-up front end perspective view of an apparatus in an embodiment of the present invention.

The dock cable ends 40 may generally be connected to a plurality of cables (not shown) that may be utilized to charge one or more batteries contained within the tablet computers and/or to transmit data from and/or to the tablet computers. FIG. 4 illustrates a close-up view of a tablet computer 28 within case 30, as described herein, snugly held in one of the pair of slots 22a, 22b so that the tablet computer 28 may be automatically connected to the dock cable end 40 disposed in alignment with the tablet computer 28 and case 30.

In an alternate embodiment of the present invention the dock cable ends 40 and/or the tablet computer's dock receptacle (not shown) may be magnetic to facilitate connecting the tablet computer 28 to the dock cable end 40.

Figure 5:
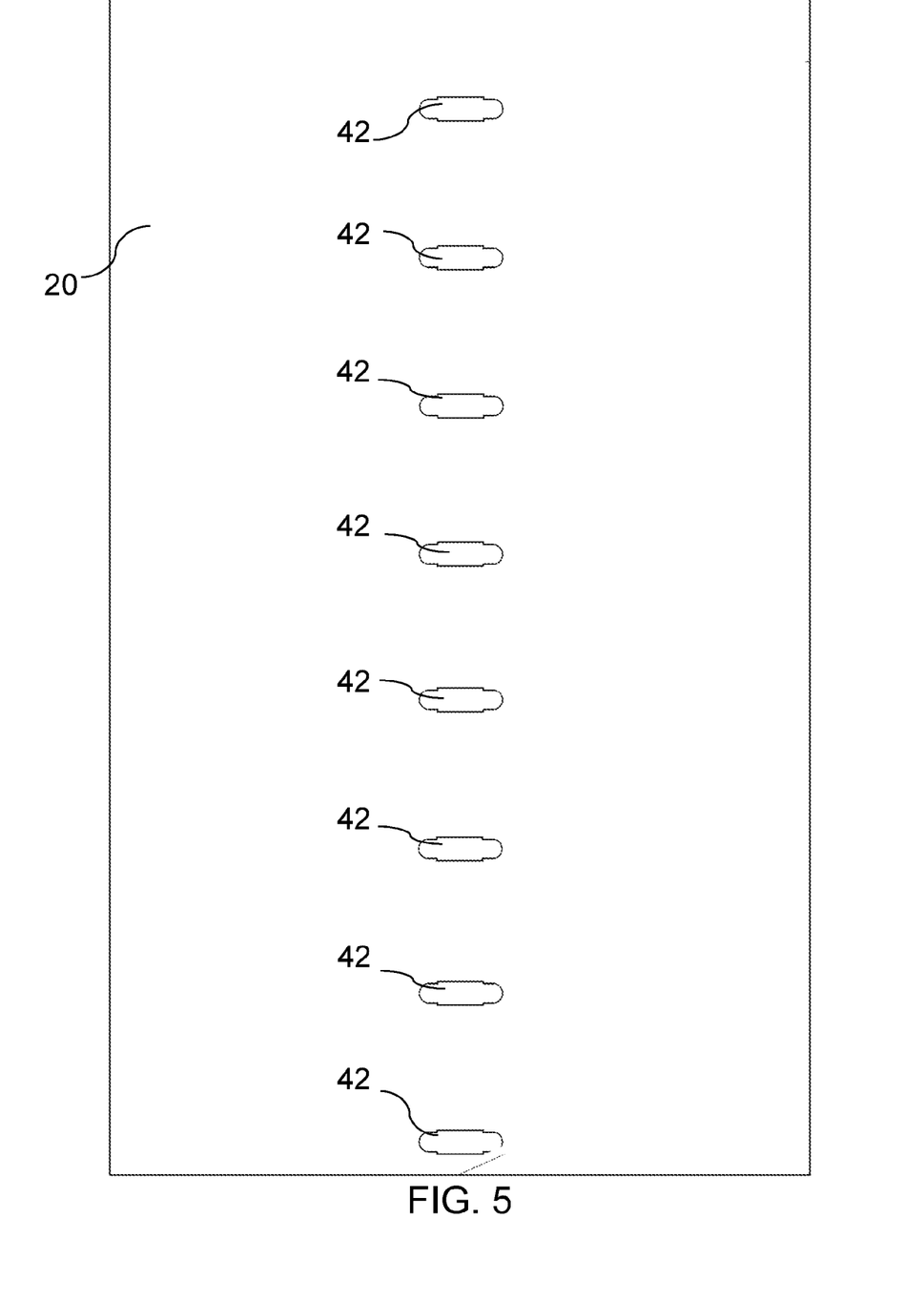
FIG. 5 illustrates a graphical representation of a back plate of the apparatus in an embodiment of the present invention.

FIG. 5 illustrates a graphical representation of a back plate 20 in an embodiment of the present invention. The plurality of dock cable openings 42 is further illustrated. Generally, the number of dock cable openings 42 corresponds to the number of pairs of slots 22a, 22b that may each hold a tablet computer, such as, preferably, an iPad.

Figure 6:
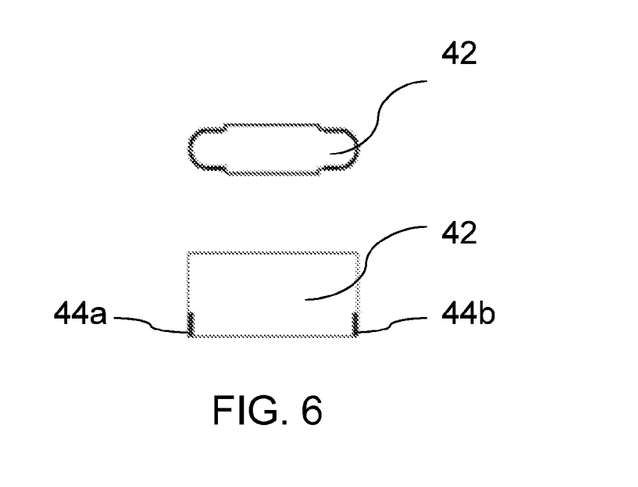
FIG. 6 illustrates a graphical representation of a plan view and a side view of a dock cable opening in the back plate of the apparatus in an embodiment of the present invention.

FIG. 6 illustrates a close-up plan view of a dock cable opening 42 and a side view thereof. The dock cable opening 42 may include a pair of cable stops 44a, 44b disposed on opposite sides of the dock cable opening 42. Thus, the dock cable opening 42 may be sized generally to receive and snugly hold a docking cable that may be utilized to connect to a tablet computer. The pair of cable stops 44a, 44b may provide a stop for a dock cable end that may be disposed therein. Thus, the dock cable opening 42 is sized and configured to rigidly hold a dock cable end such that the dock cable end automatically connects to a tablet computer when the tablet computer is disposed within the apparatus 10. Specifically, a user of the apparatus 10 may place one or more dock cable ends 40 within the plurality of dock cable openings in anticipation of receiving one or more tablet computers in the apparatus 10. Thus, the tablet computer may automatically connect to the waiting dock cable end 40 to allow the tablet computer to charge and/or transmit data.

Figure 7:
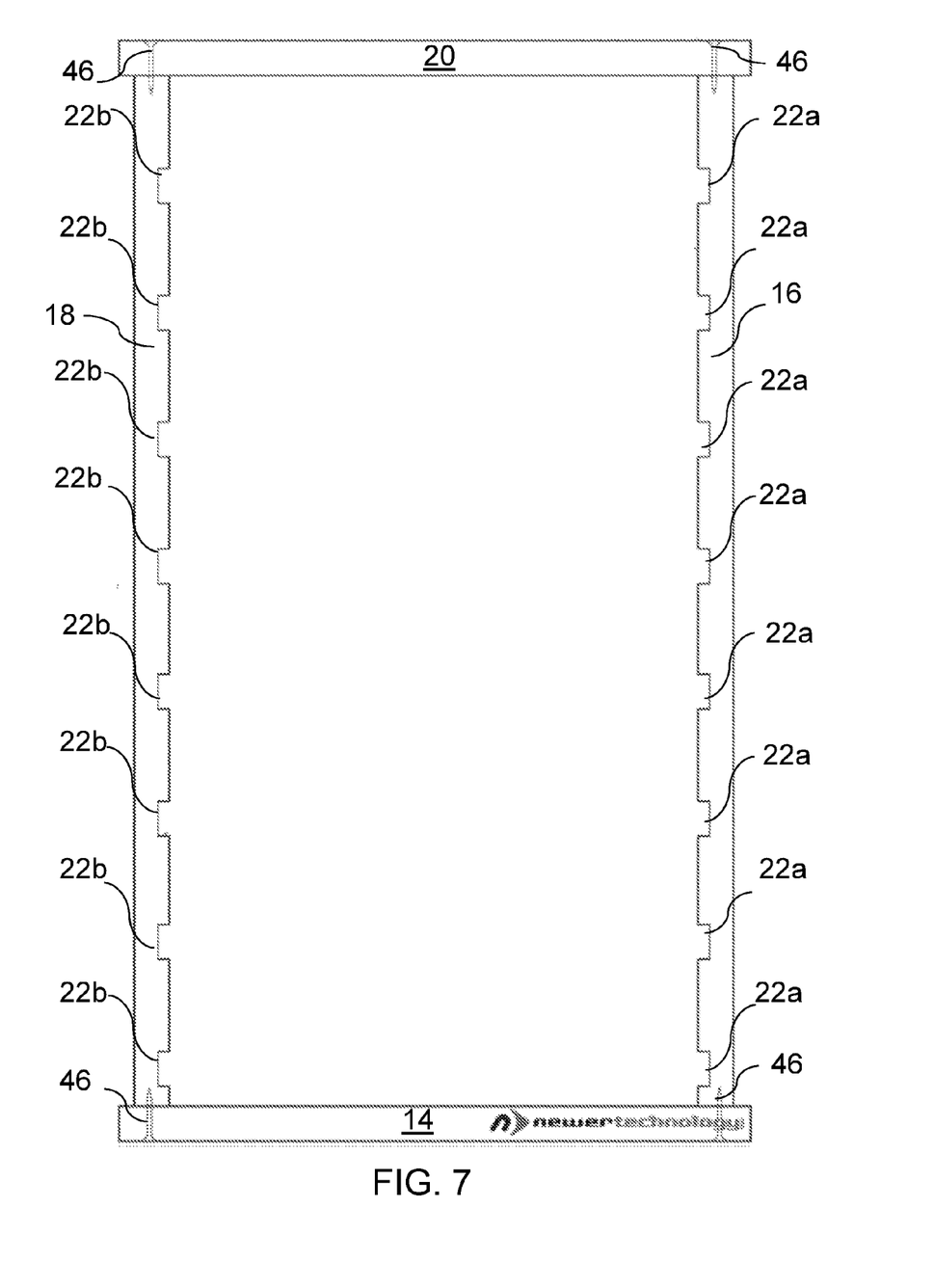
FIG. 7 illustrates a graphical representation of the apparatus of the present invention, without the back plate.

FIG. 7 illustrates a graphical representation of the two side walls 16, 18, top plate 12 and bottom base 14 in an embodiment of the present invention. Note that the back plate 20 is not shown in FIG. 7 for illustrative clarity. The plurality of pairs of slots 22a, 22b are shown, each pair of slots 22a, 22b capable of receiving a tablet computer, such as an iPad that may be disposed within a case, as described above. As shown in FIG. 7, the top plate 12 and the bottom base 14 are attached to the two side plates 16, 18 by screws 46; although, as noted above, the various pieces of the apparatus 10 may be interconnected in any manner apparent to one of ordinary skill in the art.

Figure 8:
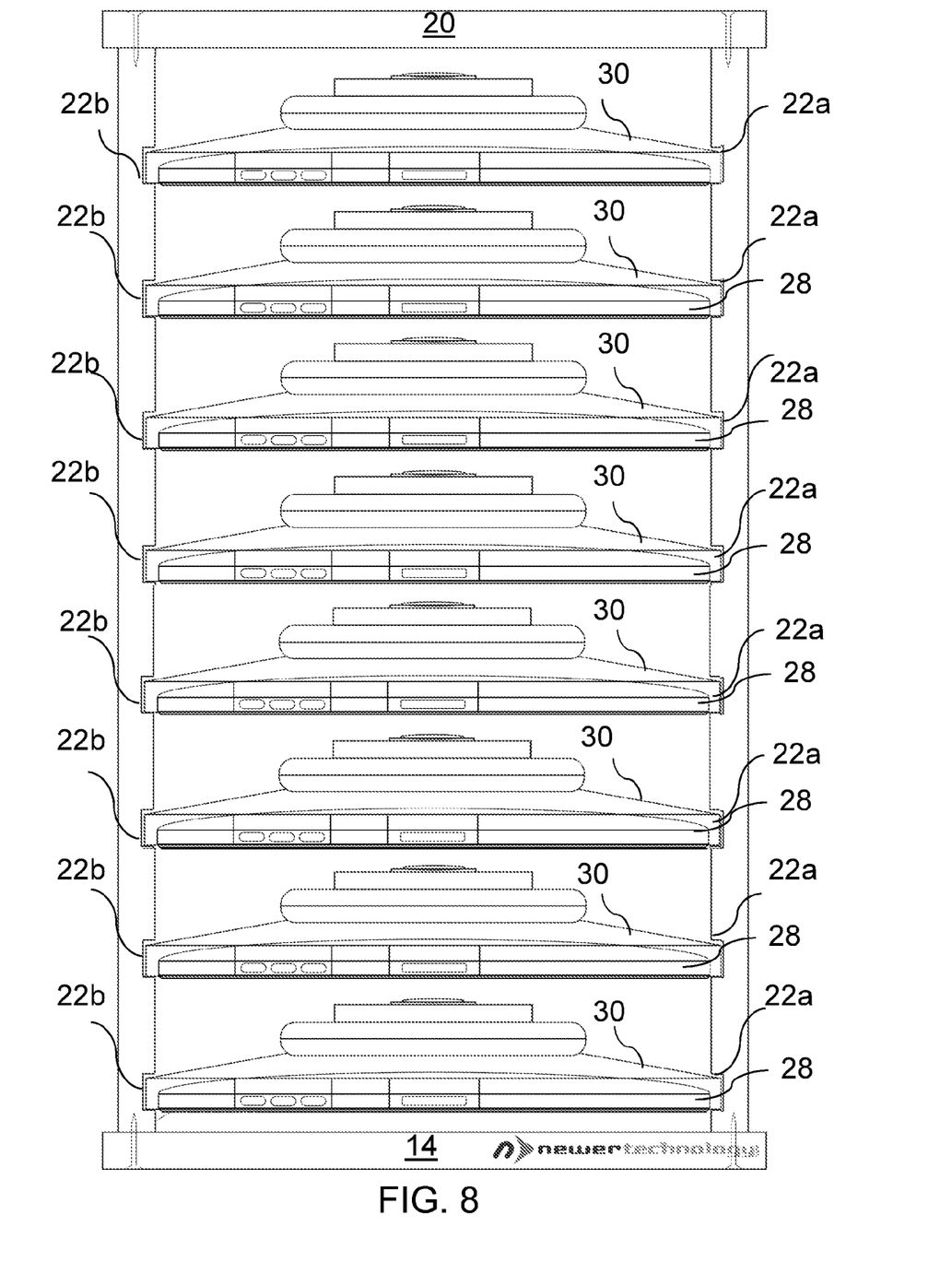
FIG. 8 illustrates a graphical representation of the apparatus of the present invention with a plurality of tablet computers contained therein in an embodiment of the present invention.

FIG. 8 illustrates apparatus 10 having a plurality of tablet computers 28 disposed within cases 30, and snugly held within pairs of slots 22a, 22b. The pairs of slots 22a, 22b may be spaced from each other to give sufficient headroom for each tablet computer 28 and case 30 that may be snugly held in place. Moreover, the apparatus 10 maintains an open interior not interrupted by full shelves that traverse from one side plate 14 to another side plate 16, so as to maximize airflow within the apparatus 10 and keep the apparatus 10 from getting too hot, especially when a plurality of tablet computers are disposed therein and charging and/or transmitting data.

Figure 9:
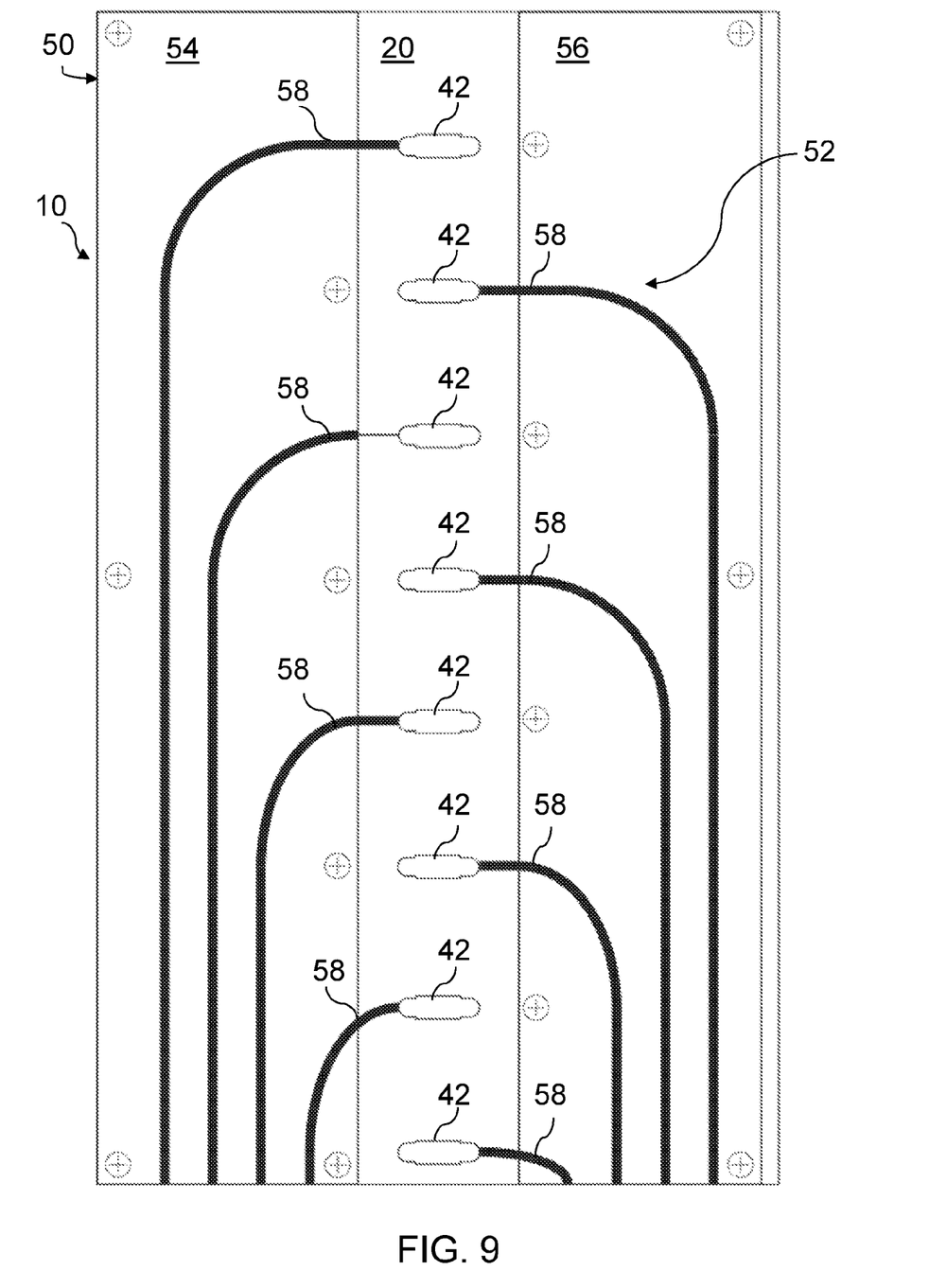
FIG. 9 illustrates a graphical representation of a back side of the apparatus of the present invention showing a cable management system.

FIG. 9 illustrates a graphical representation of a back side 50 of the apparatus 10, showing a cable management system 52. Specifically, the back side 50 may include the back plate 20 of the apparatus 10 having the plurality of dock cable openings 42 disposed therein. A pair of back end plates 54, 56 may be disposed on opposite sides of the back plate 20, and may be held onto the back plate 20 via screws, nails, brads, adhesive, or any other means apparent to one of ordinary skill in the art.

The pair of back end plates 54, 56 may have a plurality of cable passages 58 disposed for holding cables that may be disposed within the dock cable openings 42, rigidly holding the cables therein. Thus, the cables may traverse the cable passages 58 within the pair of back end plates 54, 56 in such a way as to maintain organization of the cables, and keep the cables from being confused with or otherwise interacting with one another. Generally, each cable may traverse a cable passage 58, and extend out of the apparatus 10 near the bottom base 14. Therefore, each cable may be tracked and easily connected to another computing device, a power outlet, a USB port, or any other device apparent to one of ordinary skill in the art.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A tablet computer storage apparatus comprising:
    a top plate, a bottom base, first and second parallel side walls, and a back plate configured in a box formation, wherein the box formation has a front opening;
    a first slotted groove in the first side wall and a second slotted groove in the second side wall, wherein the first slotted groove is parallel and horizontally aligned with the second slotted groove, and further wherein the first slotted groove is configured to hold a first edge of a tablet computer within the first slotted groove and the second slotted groove is configured to hold a second edge of the tablet computer within the second slotted groove; and
    an opening disposed in the back plate that provides data access to devices within the apparatus.

2. The computer storage apparatus of claim 1 further comprising:
    a dock cable for transmitting data to and from a computer wherein the dock cable is disposed through the opening disposed in the back plate.

3. The computer storage apparatus of claim 2 wherein the opening holds the dock cable rigidly.

4. The computer storage apparatus of claim 2 wherein the dock cable magnetically connects to the tablet computer when the tablet computer is disposed within the first and second slotted grooves.

5. The computer storage apparatus of claim 3 wherein the rigid dock cable connects to the tablet computer when the tablet computer is disposed within the first and second slotted grooves.

6. The computer storage apparatus of claim 2 wherein the dock cable provides charging capabilities.

7. The apparatus of claim 1 further comprising:
    at least one tab disposed on the bottom base for stabilizing the apparatus on a flat surface.

8. The apparatus of claim 7 further comprising:
    an indention disposed on a first top plate for receiving the tab of a second bottom base when a plurality of apparatuses are stacked.

9. The computer storage apparatus of claim 1 wherein the tablet computer is held snugly between the first and second slotted grooves.

10. A tablet computer storage apparatus comprising:
    a top plate, a bottom base, first and second parallel side walls, and a back plate configured in a box formation, wherein the box formation has a front opening;
    a first slotted groove in the first side wall and a second slotted groove in the second side wall, wherein the first slotted groove is parallel and horizontally aligned with the second slotted groove, and further wherein the first slotted groove is configured to hold a first edge of a first tablet computer within the first slotted groove and the second slotted groove is configured to hold a second edge of the first tablet computer within the second slotted groove, and a first opening disposed in the back plate that provides data access to devices within the apparatus; and
    a third slotted groove in the first side wall and a fourth slotted groove in the second side wall, wherein the third slotted groove is parallel and horizontally aligned with the fourth slotted groove, and further wherein the third slotted groove is configured to hold a first edge of a second tablet computer within the third slotted groove and the fourth slotted groove is configured to hold a second edge of the second tablet computer within the fourth slotted groove, and a second opening disposed in the back plate that provides data access to devices within the apparatus.

11. The computer storage apparatus of claim 10 further comprising:
a first dock cable for transmitting data to and from the first tablet computer wherein the first dock cable is disposed within the first opening; and
a second dock cable for transmitting data to and from the second tablet computer wherein the second dock cable is disposed within the second opening.

12. The computer storage apparatus of claim 11 wherein the first dock cable and second dock cable have charging capabilities.

13. The computer storage apparatus of claim 10 wherein the first dock cable automatically connects to the first tablet computer when the first tablet computer is disposed within the first and second slotted grooves and the second dock cable automatically connects to the second tablet computer when the second tablet computer is disposed within the third and fourth slotted grooves.

14. The computer storage apparatus of claim 10 wherein the first tablet computer is held snugly within the first and second slotted grooves and the second tablet computer is held snugly within the third and fourth slotted grooves.

15. A method of storing tablet computers comprising the steps of:
providing a computer storage apparatus comprising a top plate, a bottom base, first and second parallel side walls, and a back plate configured in a box formation, wherein the box formation has a front opening, a first slotted groove in the first side wall and a second slotted groove in the second side wall, wherein the first slotted groove is parallel and horizontally aligned with the second slotted groove, and further wherein the first slotted groove is configured to hold a first edge of a first tablet computer within the first slotted groove and the second slotted groove is configured to hold a second edge of the first tablet computer within the second slotted groove;
providing a first dock cable through the first opening in the back plate;
securing the first dock cable rigidly to the first opening in the back plate; and
inserting the first tablet computer into the first and second slotted grooves.

16. The method of claim 15 further comprising the steps of:
aligning the first tablet computer with the first dock cable;
pressing the first tablet computer against the first dock cable; and
automatically connecting the first tablet computer to the first dock cable when the first tablet computer is pressed against the first dock cable.

17. The method of claim 15 further comprising the steps of:
providing a second dock cable through a second opening in the back plate;
securing the second dock cable rigidly to the second opening in the back plate; and
inserting a second tablet computer into a third and fourth slotted grooves, wherein the third and fourth slotted grooves configured to hold two opposing edges of the second tablet computer.

18. The method of claim 17 further comprising the steps of:
aligning the second tablet computer with the second dock cable;
pressing the second tablet computer against the second dock cable; and
automatically connecting the second tablet computer to the second dock cable when the second tablet computer is pressed against the second dock cable.

* * * * *